(12) United States Patent
Gowdappa et al.

(10) Patent No.: US 12,386,793 B2
(45) Date of Patent: *Aug. 12, 2025

(54) DETECTING STALE STORAGE LAYOUTS WITHOUT USING CLIENT LOCKS

(71) Applicant: Red Hat, Inc., Raleigh, NC (US)

(72) Inventors: Raghavendra Gowdappa, Bangalore (IN); Shyamsundar Ranganathan, Billerica, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,183

(22) Filed: Feb. 18, 2021

(65) Prior Publication Data

US 2021/0173818 A1 Jun. 10, 2021

Related U.S. Application Data

(63) Continuation of application No. 15/163,726, filed on May 25, 2016, now Pat. No. 10,929,357.

(30) Foreign Application Priority Data

Feb. 29, 2016 (IN) .......................... 2016/41006895

(51) Int. Cl.
*G06F 16/188* (2019.01)
*G06F 16/11* (2019.01)
(Continued)

(52) U.S. Cl.
CPC .......... *G06F 16/188* (2019.01); *G06F 16/128* (2019.01); *G06F 16/137* (2019.01);
(Continued)

(58) Field of Classification Search
CPC .... G06F 16/188; G06F 16/128; G06F 16/137; G06F 16/166; G06F 16/183;
(Continued)

(56) References Cited

U.S. PATENT DOCUMENTS 5,727,197 A 3/1998 Burgess et al.
6,192,368 B1 2/2001 Gerard et al.
(Continued)

OTHER PUBLICATIONS

How GlusterFS Distribution Works, http://gluster.readthedocs.org/en/release-3.7.0/Features/dht/, 5 pages.
(Continued)

*Primary Examiner* — Cam Linh T Nguyen
(74) *Attorney, Agent, or Firm* — Dority & Manning, P.A.

(57) ABSTRACT

Systems and methods for reducing locks on a storage layout of a distributed file system by detecting and notifying clients of stale storage layouts. An example method may comprise: receiving a request to modify a file system object associated with a storage layout, the request comprising an index range and the storage layout comprising an index range; determining whether the request is associated with a stale storage layout in view of a comparison of the index range of the request and the one or more index ranges of the storage layout; receiving a lock request to prevent changes to the storage layout; and transmitting at least a portion of the storage layout to update the stale storage layout.

19 Claims, 5 Drawing Sheets

(51) Int. Cl.
  *G06F 16/13* (2019.01)
  *G06F 16/16* (2019.01)
  *G06F 16/176* (2019.01)
  *G06F 16/182* (2019.01)
  *G06F 16/23* (2019.01)

(52) U.S. Cl.
  CPC ........ *G06F 16/166* (2019.01); *G06F 16/1774* (2019.01); *G06F 16/1827* (2019.01); *G06F 16/183* (2019.01); *G06F 16/2329* (2019.01); *G06F 16/2379* (2019.01)

(58) Field of Classification Search
  CPC ............. G06F 16/1774; G06F 16/1827; G06F 16/2329; G06F 16/2379
  USPC .................................................. 707/704, 692
  See application file for complete search history.

(56) References Cited

U.S. PATENT DOCUMENTS

| | | | |
|---|---|---|---|
| 6,487,635 B1 | 11/2002 | Cohen et al. | |
| 7,111,194 B1 | 9/2006 | Schoenthal et al. | |
| 7,778,984 B2 | 8/2010 | Zhang et al. | |
| 7,809,762 B1 | 10/2010 | Parker et al. | |
| 7,860,919 B1 | 12/2010 | Patsenker et al. | |
| 8,316,099 B2 | 11/2012 | Diggs et al. | |
| 8,370,454 B2 | 2/2013 | Bauer et al. | |
| 8,429,444 B2 | 4/2013 | Rancurel et al. | |
| 8,565,721 B2 | 10/2013 | Caldwell et al. | |
| 9,715,515 B2 | 7/2017 | Teletia | |
| 9,875,270 B1* | 1/2018 | Muniswamy Reddy | G06F 16/2343 |
| 10,452,629 B2 | 10/2019 | Hrle et al. | |
| 10,614,070 B2 | 4/2020 | Behnen et al. | |
| 2003/0061223 A1 | 3/2003 | Houston et al. | |
| 2005/0120061 A1 | 6/2005 | Kraft | |
| 2006/0004886 A1 | 1/2006 | Green et al. | |
| 2006/0069672 A1* | 3/2006 | Maloney | G06F 16/2272 |
| 2006/0080345 A1* | 4/2006 | Murthy | G06F 16/2228 |
| 2006/0287984 A1* | 12/2006 | Chen | G06F 16/22 |
| 2007/0157155 A1* | 7/2007 | Peters | G06F 8/10 |
| | | | 717/100 |
| 2008/0097954 A1* | 4/2008 | Dutta | G06F 16/24553 |
| 2008/0104141 A1* | 5/2008 | McMahon | G06F 40/197 |
| | | | 707/999.203 |
| 2009/0163137 A1* | 6/2009 | Capparelli | H04H 60/06 |
| | | | 455/3.06 |
| 2010/0306408 A1 | 12/2010 | Greenberg et al. | |
| 2011/0004589 A1 | 1/2011 | Rischar et al. | |
| 2011/0320684 A1* | 12/2011 | Gorobets | G06F 12/0246 |
| | | | 711/E12.001 |
| 2013/0262852 A1* | 10/2013 | Roeder | G06F 21/602 |
| | | | 713/150 |
| 2014/0074798 A1 | 3/2014 | Karampuri et al. | |
| 2014/0324785 A1 | 10/2014 | Gupta et al. | |
| 2015/0058302 A1 | 2/2015 | Miller et al. | |
| 2015/0227414 A1* | 8/2015 | Varma | G06F 11/0793 |
| | | | 714/47.1 |
| 2015/0270958 A1* | 9/2015 | Jho | G06F 16/2228 |
| | | | 380/28 |
| 2015/0350987 A1 | 12/2015 | Chatterjea et al. | |
| 2015/0363447 A1* | 12/2015 | Dickie | G06F 16/24578 |
| | | | 707/696 |
| 2015/0363452 A1 | 12/2015 | Tu et al. | |
| 2015/0379061 A1 | 12/2015 | Paraschivescu | |
| 2016/0055054 A1 | 2/2016 | Patterson et al. | |
| 2017/0017626 A1 | 1/2017 | Simonyi et al. | |
| 2017/0091327 A1 | 3/2017 | Bostic et al. | |
| 2017/0139985 A1* | 5/2017 | Hahn | G06F 16/9535 |
| 2017/0220814 A1 | 8/2017 | Pathak | |

OTHER PUBLICATIONS

SIT, Emil, Massachusetts Institute of Technology, "Storing and Managing Data in a Distributed Hash Table" https://pdos.csail.mit.edu/papers/sit-phd-thesis.pdf, Jun. 2008, 90 pages.

"Monnerat, Luiz and Amorim, Claudio, Petrobras TIC/TIC-E&P; COPPE—Computer and Systems EngineeringFederal University of Rio de Janeiro (UFRJ), ""An Effective Single-Hop Distributed Hash Table With High Lookup Performance and Low Traffic Overhead,"" http://arxiv.org/pdf/1408.7070.pdf, 19 pages".

"Patel, Swapnil, School of Computer Science, Carnegie Mellon University, Pittsburgh, PA 15213, ""Scale and Concurrency of Massive File System Directories,"" http://repository.cmu.edu/cgi/viewcontent.cgi?article=1246&context-dissertations, May 2013, 201 pages".

* cited by examiner

DETECTING STALE STORAGE LAYOUTS WITHOUT USING CLIENT LOCKS

RELATED APPLICATIONS

This application is a continuation of U.S. patent application Ser. No. 15/163,726, filed May 25, 2016, now U.S. Pat. No. 10,929,357, which claims the benefit of priority to India Patent Application No. 2016/41006895, filed on Feb. 29, 2016, entitled "Detecting Stale Storage Layouts Without Using Client Locks," the entire contents of all are incorporated herein by reference herein.

TECHNICAL FIELD

The present disclosure generally relates to distributed file systems for storing file system objects, and more specifically relates to detecting stale storage layouts in a distributed file system.

BACKGROUND

Modern computers may use distributed file systems to store files and directories across different storage devices. A distributed file system may be accessed by multiple clients and may continuously change as new files and directories are added and removed. To avoid the creation of duplicate or conflicting files a client of the distributed file system may initiate a lock on a parent directory each time a file is added to the parent directory to avoid simultaneous changes by multiple clients. Locking the parent directory each time a file or directory is added or removed may decrease performance and scalability of the distributed file system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for enhancing a distributed file system to detect stale storage layouts and reduce the occurrence of locks on the storage layouts. The distributed file system may include multiple storage nodes and storage layouts that correspond to directories. The storage layout may indicate which file system objects are located on which storage nodes. Each storage layout may include multiple index ranges and each index range may correspond to one or more nodes. An index range may represent a range of index values and each index value may represent a file system object. In one example, the distributed file system may use one or more hash functions for determining an index value corresponding to a file system object and the index ranges may be hash ranges.

The distributed file system may change the storage layout while it is operating and may store versions of the storage layout on the nodes of the distributed file system and on clients of the distributed file system. When a storage layout is changed, the version of the storage layout stored on a client may no longer be in sync with the storage layout on the nodes and may be considered a stale storage layout. The distributed file system may detect stale storage layouts by having file system requests that include a portion of the client's storage layout, such as including an index range from the client's storage layout. The index range within the request may be compared to one or more of the index ranges of the storage layout to determine whether they match. When the index ranges match, the distributed file system may process the request without notifying the client and therefore the client may avoid having to lock the storage layout. When the index ranges do not match, the distributed file system may determine the version of the storage layout on the client is stale and may notify the client. The client may then initiate a lock on the storage layout and update the client's version of the storage layout.

Systems and methods described herein include technology for enhancing the performance and scalability of a distributed file system by reducing how often a storage layout is locked by a client. Some distributed file systems may have the client lock a storage layout corresponding to a directory every time an operation modifies a directory, such as adding a new file to the directory. Locking the storage layout every time the directory is modified may reduce the risk that the storage layout will change while the operation is performed but may result in decreased performance. An advantage of the technology disclosed herein, is that it may avoid the client locking the storage layout every time the directory is modified and may instead have the client lock the storage layout only after detecting a stale storage layout. Being that the occurrence of a stale storage layout may be significantly less than the quantity of operations modifying a directory, the technology may reduce how often the storage layout is locked by clients and therefore enhance performance and scalability. Various aspects of the above referenced methods and systems are described in details herein below by way of examples, rather than by way of limitation.

Figure 1:
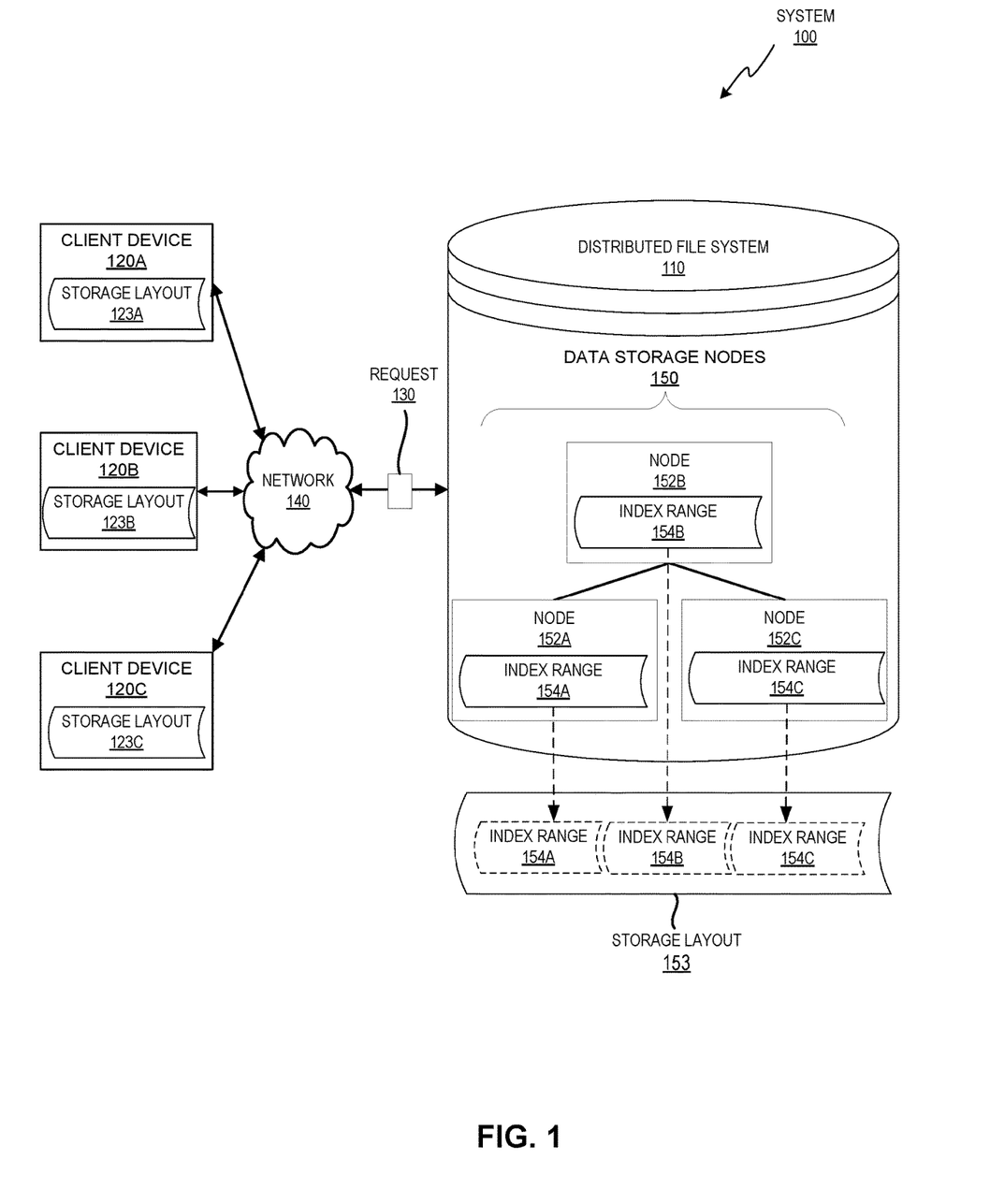
FIG. 1 depicts a high-level diagram of an example system architecture of a distributed file system, in accordance with one or more aspects of the present disclosure.

FIG. 1 illustrates an example system 100, in accordance with an implementation of the disclosure. The system 100 may include a distributed file system 110, client devices 120A-C, a request 130, and a network 140. Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Distributed file system 110 may span multiple data storage nodes 150 and may be accessed by client devices 120A-C by traversing one or more networks 140. Data storage nodes 150 may be capable of storing data for the distributed file system 110 and may function together to create, store, and modify file system objects. Each of the data storage nodes 150 may correspond to a region of storage space (e.g., volume, sub-volume, partition) and may be arranged in a hierarchical manner such that node 152B may provide access to a volume of data storage and nodes 152A and 152C may each provide access to a portion of the volume (e.g., sub-volume). The regions of storage space may store one or more file system objects.

File system objects may include file objects, directory objects, or other information used by distributed file system 110 to store, manage, or organize data. Each file system object may include content (e.g., file content), metadata (e.g., inode), or a combination thereof. The metadata may include one or more attributes or extended attributes such as identifiers (e.g., GUID, UUID), names (e.g., file name, directory name), permissions (e.g., read, write execute), type (e.g., file type), ownership, creation time, or other attributes. A file object may be a data structure that organizes data and identifies portions (e.g., locations) within a storage space (e.g., data store) that contain the corresponding data. A directory object may be a data structure for cataloging one or more file objects and directory objects (e.g., subdirectories). Directory objects may be the same or similar to folders or catalogs and may be arranged in a hierarchical manner such that there are parent directory objects and child directory objects. A directory object may include a reference pointer (e.g., linkto file, symbolic link) that points to one or more file objects within the same storage space (e.g., sub-volume) or a different storage space.

Distributed file system 110 may have decentralized file system management, centralized file system management or a combination of both (e.g., hierarchical). A decentralized file system management may include a file system that has more than one node (e.g., all nodes) managing the data storage activities of data storage nodes 150. A centralized file system management may include a distributed file system 110 where one of the nodes manages the data storage activities of some or all of the other nodes. Distributed file system 110 may also have a partially centralized and partially decentralized management. For example, there may be an arrangement that includes multiple nodes in a hierarchical arrangement (e.g., tree or star storage topology) such that a top-level node manages one or more mid-level nodes and a mid-level node manages one or more lower-level nodes. A simplified hierarchical arrangement is illustrated in FIG. 1 in regards to nodes 152A-C.

Nodes 152A-C may be associated with the same computing device or may each be associated with one or more different computing devices. In one example, nodes 152A-C may be located on the same computing device and each of nodes 152A-C may be associated with a separate computing process that manages its portion of storage space. In another example, nodes 152A-C may each be located on a separate computing device (e.g., node device) that is connected with one or more of the other node devices. Each of the separate computing devices may be capable of participating in a distributed file system and may be a client device (e.g., desktop, laptop, and tablet), a server device (e.g., server of a cluster), a data storage device (e.g., Network Attached Storage (NAS) or Storage Area Network (SAN)), other computing device, or a combination thereof. Data storage nodes 150 may each contribute data storage resources, data processing resources or a combination thereof. In one example, all of the nodes may provide data storage resources and data processing resources for distributed file system 110. In another example, one or more of the nodes may provide data processing resources to manage other nodes without providing data storage resources to store file system objects for distributed file system 110.

Storage layout 153 may be a data structure or combination of data structures that indicate the physical or logical location of a file system object. The data structure may be composed of multiple separate mapping data structure such as indexes or hashes that may include one or more values (e.g., index values, hash values) or ranges of values that represent which file system objects are stored on which nodes. Storage layout 153 may be composed of separate index ranges 154A-C that may each originate and be stored on separate nodes and when combined together make up the storage layout 153. A version of storage layout 153 may be stored (e.g., generated, cached) on one or more of the nodes 152A-C or one or more of the client devices 120A-C. In one example, storage layout 153 may correspond to a directory object and each directory object in a file system hierarchy may correspond to a single storage layout or correspond to no storage layouts or multiple storage layouts.

Storage layout 153 may include one or more index ranges 154A-C that each correspond to a region of storage space on one or more nodes 152A-C. In one example, storage layout 153 may correspond to a storage volume and the index ranges may correspond to portions of the storage volume (e.g., sub-volume). As shown in FIG. 1, storage layout 153 may be composed of three index ranges 154A-C and each of the index ranges may correspond to a separate node containing a region of storage space capable of storing one or more file system objects. In a simplified example, storage layout 153 may include three index ranges (e.g., 0-99, 100-199, 200-299) and a file system object associated with an index value within the first range may be stored on node 152A and a file system object with an index value within the second range may be stored on node 152B and a file system object with an index value within the third range may be stored on node 152C.

Each of the index ranges 154A-C may include one or more index values. The index values may indicate the beginning, end, middle or other part of the range and may be associated with a specific file system object. In one example, an index value may be determined based on an object identifier for a file system object. The object identifier may include any identifier, such as an object name (e.g., file name or directory name) or a unique identifier (e.g., UUID, GUID) that identifies the file system object and is able to distinguish the file system object from other objects (e.g., all other objects) within the distributed file system. The object identifier may also or alternatively include a directory path (e.g., absolute path or relative path) or a portion of the file system object such as a portion of the content of a file object. Index ranges 154A-C and index values may be hash ranges and hash values respectively. The hash ranges and hash values may be generated using a hash function. The hash function may be any function that is capable of mapping data of arbitrary size (e.g., object identifier) to data of a smaller size (e.g., index value, hash value), which may be a fixed size.

Client devices 120A-C may include storage layouts 123A-C and may communicate with distributed file system 110 to access or modify file system objects. Client devices 120A-C may be external to the distributed file system 110, as shown in FIG. 1, or may be internal to the distributed file system. For example, node 152C may function as a client device for node 152B. Storage layouts 123A-C may be a cached versions of storage layout 153 and may be generated or retrieved from one or more nodes 152A-C of distributed file system 110. Client devices 120A-C may use their respective storage layout to determine which of the nodes 120A-C are storing a particular file system object. This may involve client device 120A calculating an index value corresponding to the particular file system object and comparing the index value with one or more index ranges of storage layout 123A. This may enable client device 120A to identify a specific index range that includes the index value and the specific index range may correspond to a specific node. Client device 120A may then transmit a request over a connection to the specific node (e.g., 152C) to access or modify the particular file system object.

Each of the client devices 120A-C may have one or more connections with one or more nodes 152A-C. The connection may be an indirect connection with a node or a direct connection with a node. An indirect connection with a node may include a combination of one or more communication channels that pass through an intermediate node. For example, an indirect connection between client device 120A and node 152C may involve a first communication channel between client device 120A and node 152B and a second communication channel between node 152B and node 152C. A direct connection is one in which a client device 120A has a communication channel between itself and a node (e.g., 152C) without traversing an intermediate node. Either type of connection may be used to send a request 130.

Request 130 may be a message sent from a client (e.g., client device or node) to modify a file system object within distributed file system 110. Request 130 may include one or more file system operations, index values, index ranges, or a combination thereof. A file system operation may be any instruction or command that affects a file system object that exists or will subsequently exist on distributed file system 110. For example, a file system operation may involve accessing, creating, deleting, or modifying one or more file system objects (e.g., file objects, directory objects, links or metadata).

An index value included within the request may be the same or similar to an index value discussed above in regards to the index ranges. The index value of the request may be determined or calculated by a client in view of an object identifier of the file system object. The index value may uniquely correspond to a file system object located within the distributed file system 110 or may subsequently be created within the distributed file system 110. An index value may include numeric values, alphanumeric values, hexadecimal values, binary values, character values, other values, or a combination thereof.

The index range included within the request may be the same or similar to the index range discussed above in regards to storage layout 153. The index range may be selected by a client from a storage layout cached on the client (e.g., storage layout 123A) and may be selected based on the index value of the file system object. An index range may be defined by one or more index values. In one example, an index range may be defined by multiple index values, such as by index values at opposing ends of a range. An index range defined by opposing ends of a range may include a first index value (e.g., 0x0000) representing a beginning of the range and a second index value (e.g., 0xFFFF) representing an end of the range. In another example, an index range may be defined by a single index value and a quantity value. The single index value may indicate a beginning index value, an end index value or an intermediate index value and the quantity value may indicate the size of the range relative to the single index value. If the single index value is 100 and the quantity is 50, the index range may be 100-150 if the index value is the beginning, 50-100 if the index value is the end or 75-125 if the index value is at the middle of the range (i.e., intermediate value).

The index values used to define a range may or may not be included within the index. In one example, the index values used to define the range may be index values that are actually within the index. In other examples, the index values may define a range but the index (e.g., index table) may not necessarily include entries corresponding to those index values. In this latter example, the range may be 0x00-0x8F but there may not be an entry for either 0x00 or 0x8F but there may be one or more intermediate entries (0x01, 0x8E).

An advantage of including the index range from the client within the request is that it may be used by the computing device receiving the request, such as a node of the distributed file system, to determine whether the client has a stale version of the storage layout. The use of the index range will be discussed in more detail in regards to FIG. 2 below.

Figure 2:
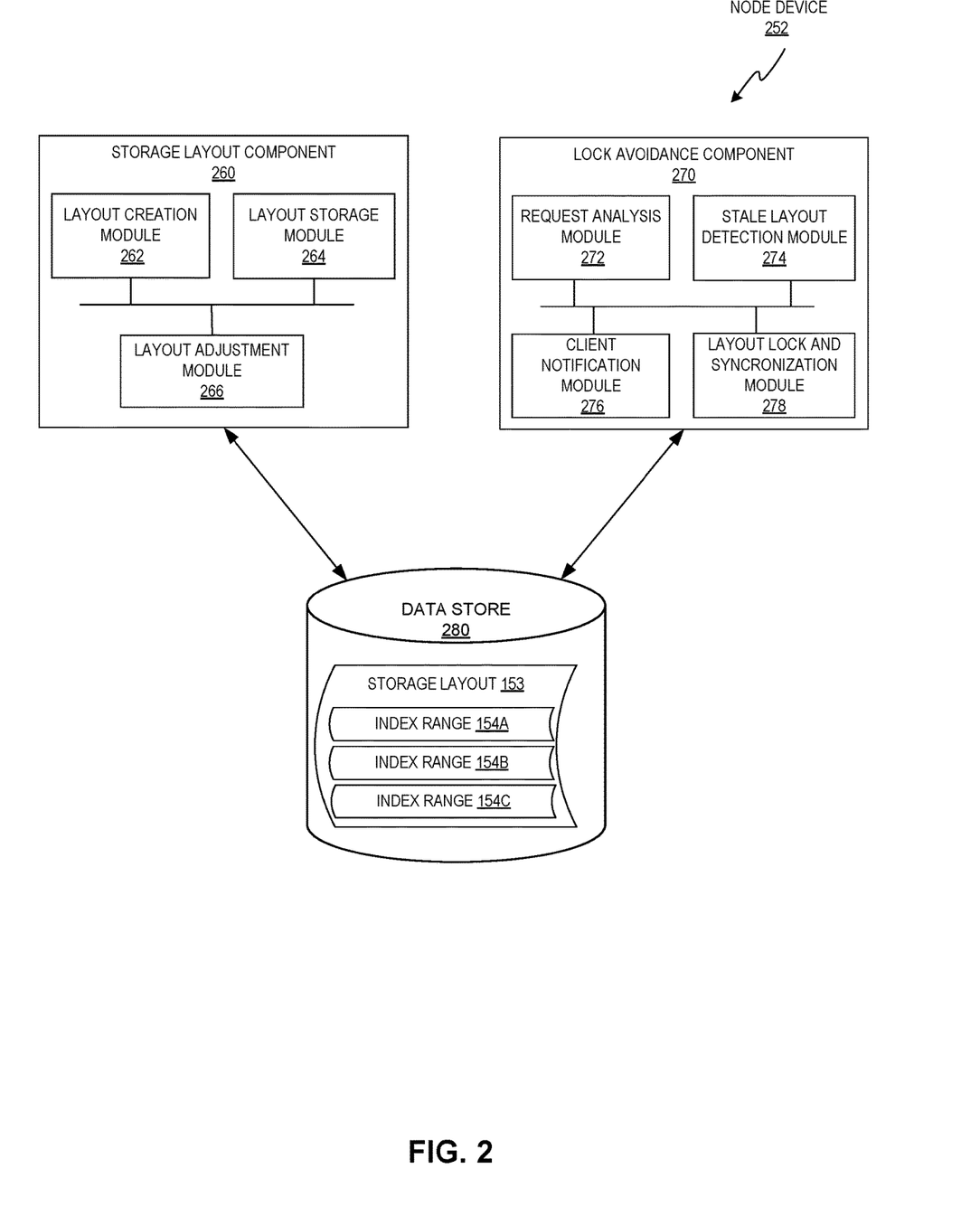
FIG. 2 depicts a high-level diagram of an example node of the distributed file system, in accordance with one or more aspects of the present disclosure.

FIG. 2 depicts a block diagram of an exemplary node 252 that contributes to distributed file system (not shown) and processes requests that modify file system objects. Node 252 may be the same or similar to node 152B of FIG. 1 and may include a storage layout component 260, a lock avoidance component 270, and a data store 280. Data store 280 may store storage layout 153 and index ranges 154A-C discussed above in regards to FIG. 1.

Storage layout component 260 may handle creating, storing and modifying storage layouts for the distributed file system. Storage layout component 260 may include a layout creation module 262, a layout storage module 264, and a layout adjustment module 266.

Layout creation module 262 may generate a storage layout 153 from one or more indexes that identify the physical or logical location of a file system object. Each index may be a table that includes entries for file system objects and maps a file system object to a location within a region of storage space. In one example, an index may include an entry for each and every file system object that is currently or previously stored within the region of storage space. Layout creation module 262 may identify the range of the one or more indexes and may interact with layout storage module 264 to store storage layout 153.

Layout storage module 264 may store storage layout 153 or a portion of storage layout 153 on one or more nodes or client devices. As discussed above, the storage layout may correspond to a directory object with in the distributed file system and may be considered a directory storage layout or directory layout. Storage layout 153 may be stored within the metadata associated of its corresponding directory object. For example, the storage layout may be stored within an attributed (e.g., extended attribute) of the directory object. In one example, the entire storage layout (e.g., all index ranges) spanning multiple nodes may be stored in each of the associated nodes as attributes of the directory object. In other examples, a portion of the storage layout (e.g., single index range corresponding to a sub-volume) may be stored on each node and a single node may not include the entire storage layout (e.g., all index ranges).

Layout adjustment module 266 may adjust the storage layout to account for changes in the distributed file system. The distributed file system may expand or retract during operation to account for added or removed nodes of for changes in the storage resources of existing nodes. When a change occurs, one of the nodes or client devices may utilize layout adjustment module 266 to adjust the storage layout for the distributed file system. Layout adjustment module 266 may migrate file system objects between nodes and function as a part of a rebalancing process to better distribute the storage load across the distributed file system. For example, the distributed file system may have a total of 300 file system objects that are spread across two nodes such that the nodes have index ranges of 0-149 and 150-299 respectively. When another node is added the rebalancing process may adjust the location of the file system objects to distribute the file system objects across all available nodes (e.g., three nodes) and the layout adjustment module 266 may modify the storage layout to adjust the existing index ranges and add an additional index range so that the index ranges are 0-99, 100-199, and 200-299 respectively. Layout adjustment module 266 may adjust the storage layout for the three nodes but may not update the client devices other nodes of the distributed file system. In which case, the client devices and other nodes and may include a stale storage layout that indicates file system object 100 is on the first node (e.g., previously 1-149) even though it is now on the second node (e.g., 100-199).

Node 252 may also include a lock avoidance component 270 that may interact with the storage layout component 260. Lock avoidance component 270 may include technology for reducing how often the storage layout is locked by clients. As discussed above, some distributed file systems may have the client lock a storage layout of a directory every time an operation modifies the directory (e.g., addition of a file object). An advantage of lock avoidance component 270 is that it may determine when to avoid having the client lock storage layout 153 and when to have the client lock storage area 153 (e.g., when storage layout is stale). Lock avoidance component 270 may include a request analysis module 272, a stale layout detection module 274, a client notification module 276, and a layout lock and synchronization module 278.

Request analysis module 272 may receive and analyze a request to modify the distributed file system. Request analysis module 272 may receive the request from a client, which may be another node internal to the distributed file system or a computing device external to the distributed file system. Request analysis module 272 may analyze the request to identify a file system operation, an index value or an index range. Although the file system operations may modify file system objects (e.g., directory objects) this may not modify the storage layout for the directory object. For example adding a new file object to an existing directory object may not change the storage layout because the storage layout may include multiple index ranges that remain unchanged. This may be because adding a new index value (e.g., intermediate index value) to an index may not change the index ranges associated with the nodes and therefore may not change the storage layout. Even though the file system operations may not change the storage layout, they may be adversely affected by a stale storage layout. For example, if the client is using a stale storage layout the index ranges may be out of sync with their respective nodes and the client may attempt to access or modify a file system object by communicating with a node that previously included the file but which has since been migrated to another node. To address this concern the node may include a stale layout detection module 274.

Stale layout detection module 274 may determine the request is from a client using a version of a storage layout that is stale (e.g., out of sync) with the storage layout associated with the node. Stale layout detection module 274 may determine whether a client is using a stale version of the storage layout by comparing storage layout information from the request with storage layout information from the node. Stale layout detection module 274 may receive the index range of the request from request analysis module 272 and may compare the index range of the request with the one or more index range associated with the node. Comparing the client index range to the node index range may involve comparing one or more index values of the client index range with one or more index values of the node index range. In one example, the request may include a single index range and the storage layout of the node may include multiple index ranges. In this situation, the stale layout detection module 274 may compare the client index range to one or more of the index ranges of the storage layout on the node. This comparison may involve iterating through each index range until a matching index range is discovered or until all of the index ranges have been compared. When there is a match the stale layout detection module 274 determines that the client storage layout is current and when there is no match the stale layout detection module 274 may determine the client storage layout is stale and may interact with client notification module 276.

Client notification module 276 may notify the client that it has a stale storage layout. The notification may be any signal, communication, or message that can indicate to the client that the client's version of the storage layout is not synchronized with the version of the storage layout on node 274. In one example, client notification module 276 may transmit a message over a network from node 252 to the client and the message (e.g., error, warning, or informational message) may indicate a particular state of the client's storage layout (e.g., STALE LAYOUT). When a client receives the notification, the client may communicate with layout lock and synchronization module 278.

Layout lock and synchronization module 278 may interact with the client to lock the storage layout of the node. Module 278 may be initiated by the client or the node and may lock the entire storage layout or only a portion of the storage layout (e.g., lock on a single index range). As discussed above, the storage layout may include multiple index ranges and the entire storage layout may not be stored on a single node and may instead be spread across multiple nodes. In this situation, the locking mechanism may acquire a lock on one or more index ranges on local node 252 (e.g., local index ranges) without acquiring a lock on the other nodes. Prior to acquiring the lock on the local index range the locking mechanism may check to see if any other index ranges associated with the storage layout are locked and if so may delay or abort the lock.

Layout lock and synchronization module 278 may also interact with the client to update the client's version of the storage layout. After the client has acquired a lock on the storage layout, the client may initiate the synchronization of the storage layout and module 278 may transfer a portion of the storage layout to the client. The client may interact with a single node (e.g., node 252) or multiple nodes to synchronize (e.g., refresh, update) the client's version of the storage layout. For example, the client may communicate with multiple separate nodes and from each node the client may receive one or more index ranges local to that node and process (e.g., concatenate) the index ranges to synchronize the client's version of the storage layout with the storage layout of distributed file system. In another example, the client may communicate with a single node and may receive one or more index ranges for multiple nodes and may process (e.g., concatenate) the index ranges to synchronize the client's version of the storage layout with the storage layout of distributed file system.

Figure 3:
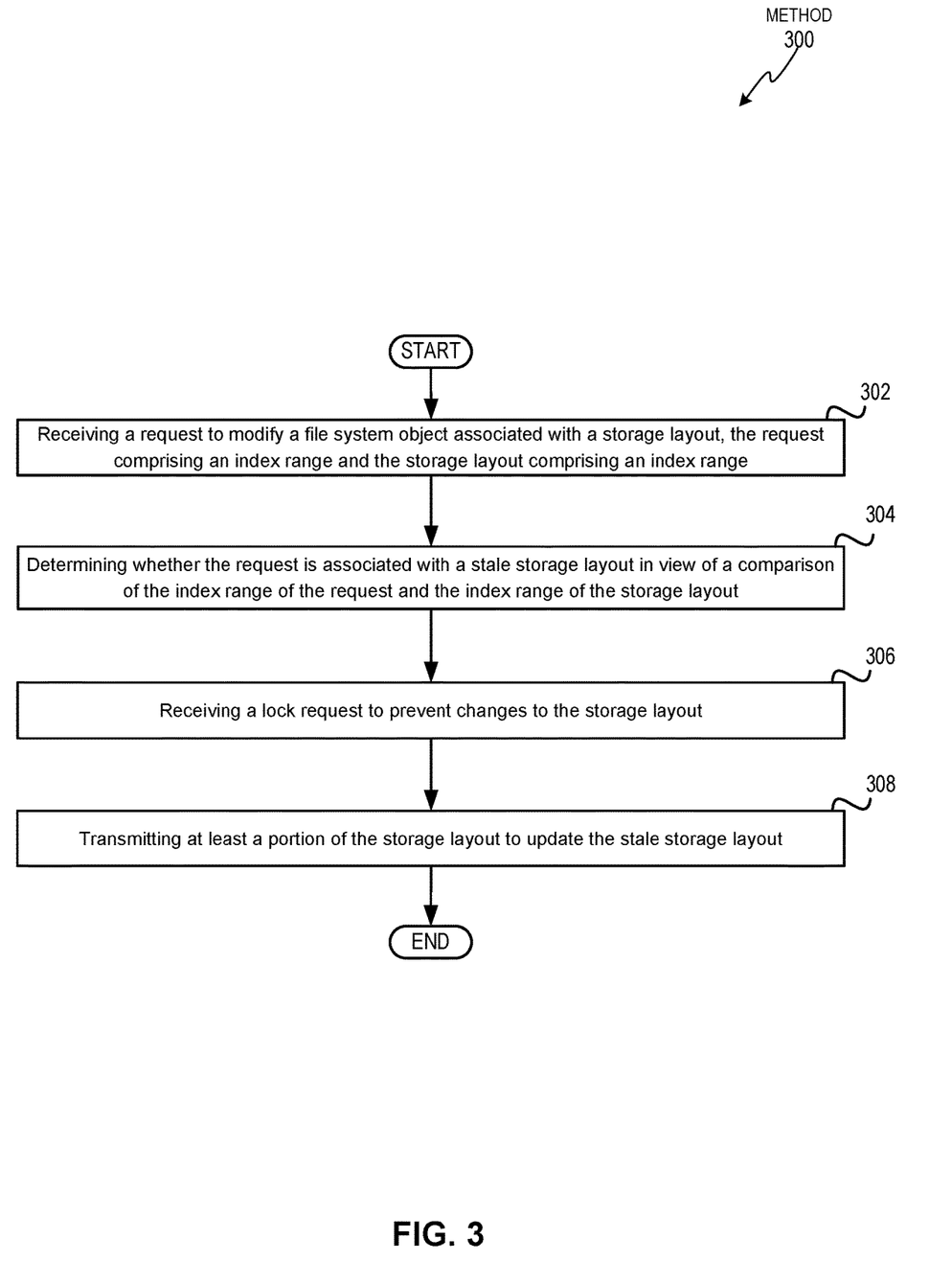
FIG. 3 depicts a flow diagram of an example method for reducing locks on a storage layout of the distributed file system, in accordance with one or more aspects of the present disclosure.
Figure 4:
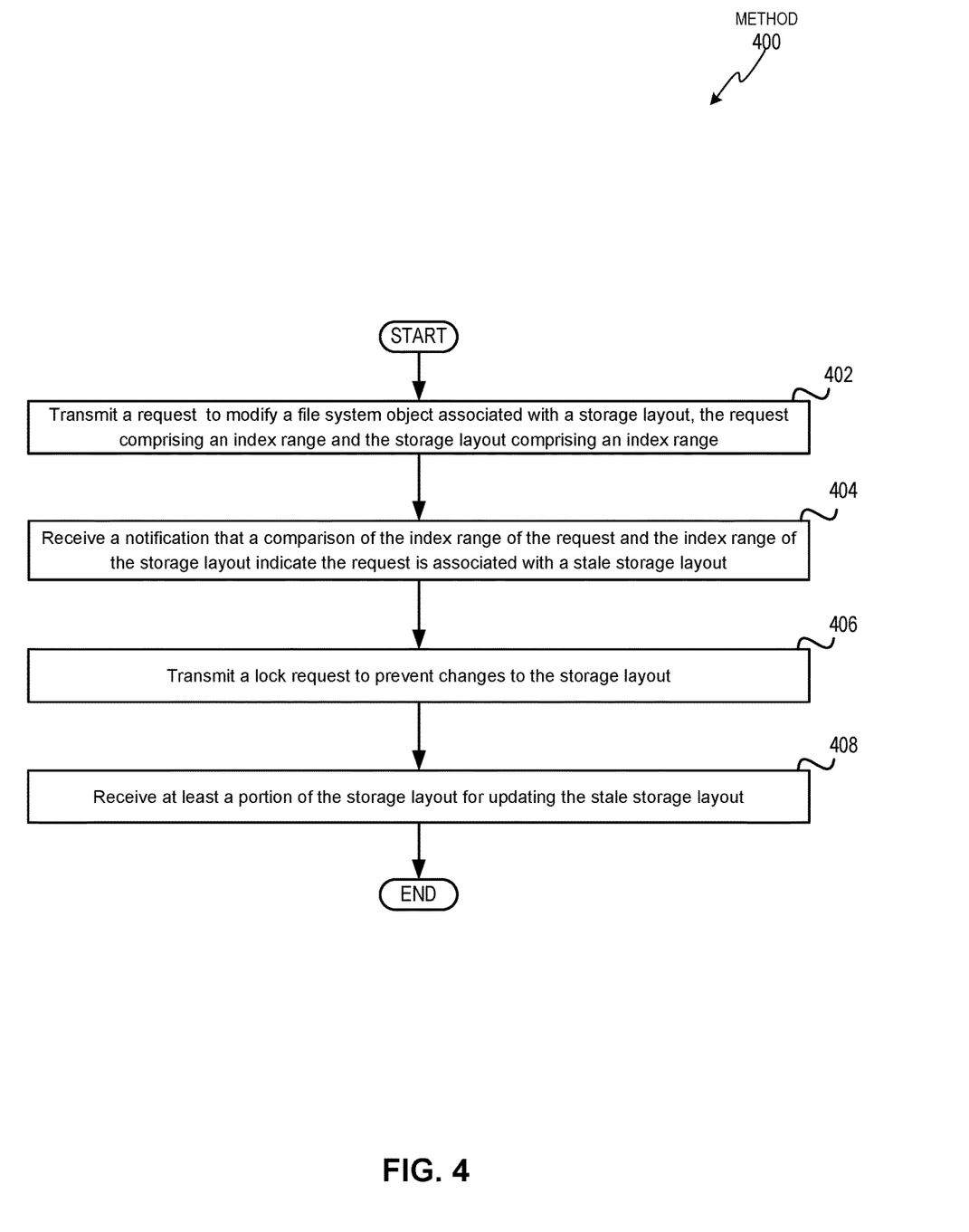
FIG. 4 depicts a flow diagram of another example method for reducing locks on a storage layout of the distributed file system, in accordance with one or more aspects of the present disclosure.

FIGS. 3 and 4 depict flow diagrams for illustrative examples of methods 300 and 400 for reducing storage layout locks by detecting and notifying clients of stale storage layouts. Method 300 may illustrate a method running on a server of the distributed file system (e.g., node servicing requests) and method 400 may illustrate a method running on a client of the distributed file system (e.g., client device or node submitting requests). Methods 300 and 400 may be performed by processing devices that may comprise hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by nodes 152A-C and 252 as shown in FIGS. 1 and 2 respectively.

Referring to FIG. 3, method 300 may be performed by processing devices of a computing device (e.g., node 232) and may begin at block 302. At block 302, the processing device may receive a request to modify a file system object associated with a storage layout, the request may include an index range and the storage layout may include an index range. The storage layout may be associated with a directory object corresponding to one or more index ranges that span multiple node devices of a distributed file system. Each of the one or more index ranges may correspond to a storage area on one of the multiple node devices. The request may be received by a node of the distributed file system from either a client external to the distributed file system (e.g., client device 120B) or a client internal to the distributed file system (e.g., node 152B). In one example, the file system object may be a directory object and the request to modify the file system object may include an instruction to create a file object within the directory object, an instruction to create a directory object within the directory object, an instruction to remove a directory within the directory object, an instruction to rename a file system object within the directory object, an instruction to create a link within the directory object, another instruction or a combination thereof.

At block 304, the processing device may determine whether the request is associated with a stale storage layout in view of a comparison of the index range of the request and the one or more index ranges of the storage layout. The stale storage layout may be an older version of the storage layout and may be stored on a client of the distributed file system. The process of determining whether the request is associated with a stale storage layout may involve determining that the index range of the request does not match any of the one or more index ranges of the storage layout. In one example, after the determination the processing device may transmit a message to a client to indicate the client's request is associated with a stale storage layout.

At block 306, the processing device may receive a lock request to prevent changes to the storage layout. The lock request may be received from a client in response to the request being associated with the stale storage layout. By including a mechanism to detect stale storage layouts the clients may selectively lock the layout only when a stale storage layout is detected and may therefore avoid locking the storage layout every time the file system objects are added to a directory object. This may enable the storage layout to remain unlocked by the client during a creation of a file object when the request is determined to be associated with a non-stale storage layout (e.g., current storage layout).

At block 308, the processing device may transmit at least a portion of the storage layout to update the stale storage layout on the client. Once the client receives the portion of the storage layout, it may use the portion to synchronize (e.g., refresh, update) the client's version of the storage layout. The client may communicate with a single node or multiple separate nodes to gather the one or more portions (e.g., index ranges) of the storage layout. In one example, the index range of the request and the index ranges of the storage layout may be hash ranges. The hash values of the hash ranges may be generated based on object identifiers of file system objects associated with the storage layout. Responsive to completing the operations described herein above with references to block 308, the method may terminate.

Referring to FIG. 4, method 400 may begin at block 402. At block 402, the processing device of a client may transmit a request to modify a file system object associated with a storage layout of a file system. The storage layout may include one or more index ranges corresponding to one or more storage areas. The request may include an index range and the request may be transmitted from the client to a node of the distributed file system. The request may also include an index value representing the file system object or identifying a location of the file system object. The index value may be calculated in view of an object identifier of the file system object and may be a value that is within the index range of the request but not within the corresponding version of the index range on the node (e.g., non-stale version of index range). In one example, the index values and index ranges may be based on a hash function as discussed above.

At block 404, the processing device may receive a notification that a comparison of the index range of the request and the index ranges of the storage layout indicate the request is associated with a stale storage layout. The comparison of the index range may involve comparing a value of the index range of the request with a value of at least one of the one or more index ranges of the storage layout.

At block 406, the processing device may transmit a lock request to prevent changes to the storage layout. Block 406 may be similar to block 306 and may be the client side of a client-server interaction. In one example, the processing device may transmit the lock request in response to being notified that an earlier request sent by the client is associated with a stale storage layout. Once the storage layout is locked, the processing device may transmit a request for an updated portion of the storage layout.

At block 408, the processing device may receive at least a portion of the storage layout for updating the stale storage layout. The portion of the storage layout may be received from one or more of the nodes of the distributed file system. In one example, each node may provide its portion of the storage layout, which may include the index ranges local to that node. In another example, a single node may transmit the portion of the storage layout local to that node (e.g., local index ranges) as well as the portions of the storage layout from other nodes (e.g., remote index ranges). The processing device may then use the portion(s) of the storage layout to update (e.g., synchronize) the client's version of the storage layout and may initiate the release of the lock on the storage layout on the node.

Blocks 406 and 408 may be optional depending on whether the storage layout of the client is stale. For example, if the storage layout was not stale the distributed file system may process the request to modify the file system object without notifying the client that there is a stale storage layout. Therefore, the client would avoid initiating the lock request and receiving the updated storage layout.

In another example method, the client may transmit a second request to modify the file system object associated with the storage layout. The second request may include an index range that aligns (e.g., matches) with the one or more index ranges of the updated storage layout and may be processed without locking the storage. Responsive to completing the operations described herein above with references to block 408, the method may terminate.

Figure 5:
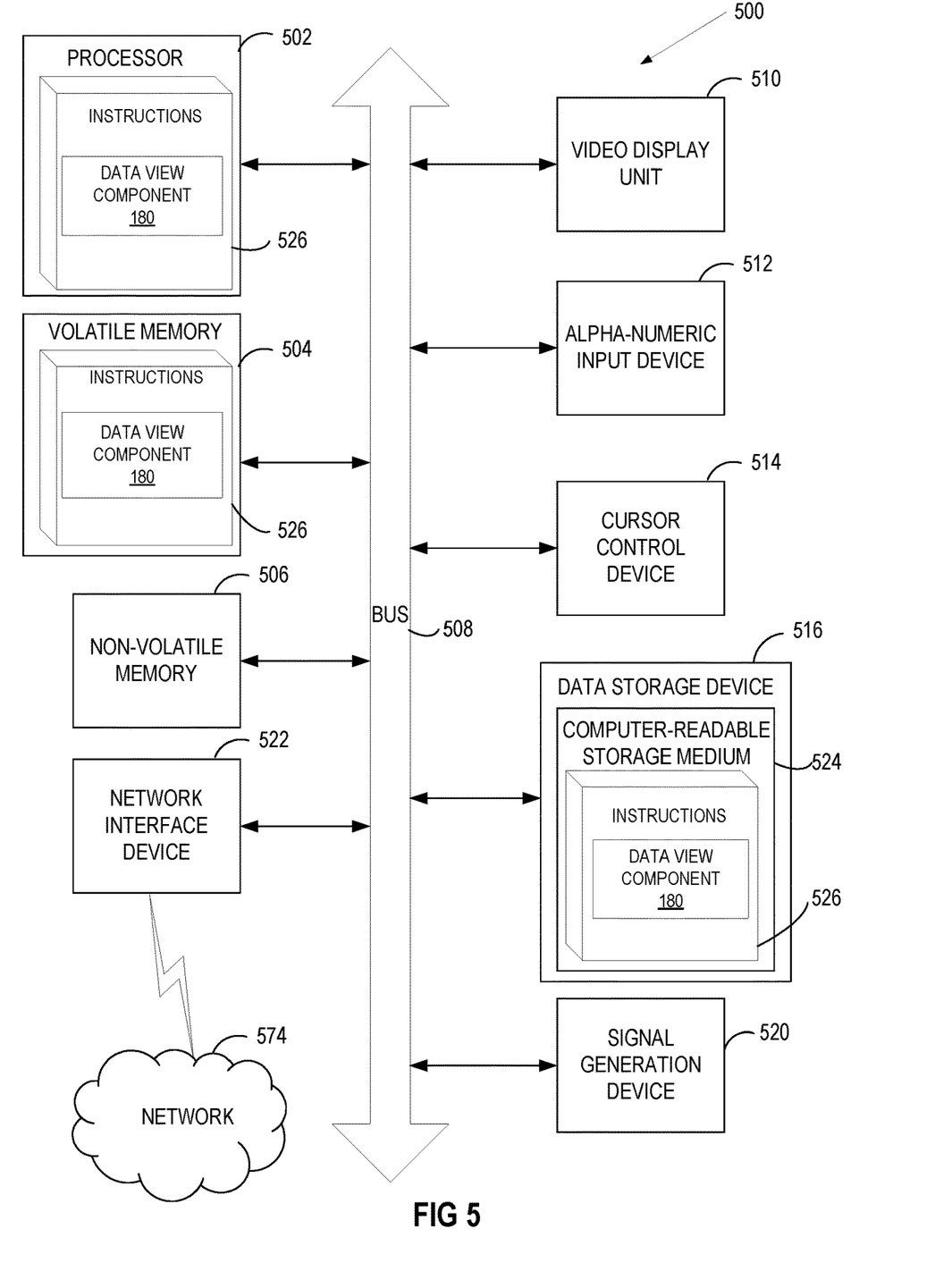
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to example system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding storage layout component 260 (not shown) or lock avoidance component 270 (not shown) of FIG. 2 implementing methods 300 or 400.

Instructions 526 may also reside, completely or partially, within volatile memory 504 and/or within processor 502 during execution thereof by computer system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving," "transmitting," "arranging," "combining," "generating," "inspecting," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    transmitting, by a client device to a node of a distributed file system, a request to modify a file system object of the distributed file system, wherein the request comprises a first index range indicating a beginning and an ending of a first set of file system objects stored by the node, the first index range comprising a first hash range, and wherein the first index range is based on a particular version of a storage layout of the distributed file system stored on the client device;
    receiving, by the client device from the node, a notification that the particular version of the storage layout of the distributed file system stored on the client device comprises a stale version of the storage layout of the distributed file system, wherein the notification is sent by the node responsive to the first index range not matching a second index range of the storage layout of the distributed file system, the second index range comprising a second hash range;
    sending, by the client device to the node, a lock request to prevent changes to the storage layout responsive to the notification;
    receiving, by the client device, at least a portion of the storage layout corresponding to the first index range to update the stale version of the storage layout to the second index range associated with the request; and
    updating, by the client device, the particular version of the storage layout stored on the client device based on the at least the portion of the storage layout corresponding to the first index range.

2. The method of claim 1, wherein sending the lock request is in response to the particular version of the storage layout of the distributed file system stored on the client device comprising the stale version of the storage layout of the distributed file system.

3. The method of claim 1, wherein the storage layout of the distributed file system is associated with a directory object corresponding to one or more index ranges that span multiple nodes of the distributed file system, wherein each of the one or more index ranges correspond to a storage area on one of the multiple nodes.

4. The method of claim 1, wherein the stale version of the storage layout is an older version of the storage layout of the distributed file system.

5. The method of claim 1, wherein the file system object is a directory object and the request to modify the file system object comprises at least one of: an instruction to create a file object within the directory object, an instruction to create a subdirectory object within the directory object, an instruction to remove a subdirectory within the directory object, an instruction to rename the file system object within the directory object, or an instruction to create a link within the directory object.

6. The method of claim 1, wherein the request further comprises an index value representing the file system object or identifying a location of the file system object, wherein the index value is calculated in view of an object identifier of the file system object and is within the first index range of the request, wherein the index value is not within the second index range.

7. The method of claim 1, wherein receiving the notification is in response to a comparison by the node of a value of the first index range of the request with a value of the second index range of the storage layout of the distributed file system.

8. The method of claim 1, further comprising:
    transmitting, by the client device to the node of the distributed file system, a second request to create a second file system object, wherein the storage layout of the distributed file system is associated with a directory object and remains unlocked by the client device during a creation of the second file system object when the second request is not associated with the stale version of the storage layout.

9. The method of claim 1, further comprising:
    responsive to receiving the notification, sending a request to the node to transmit the portion of the storage layout to update the stale version of the storage layout.

10. The method of claim 1, further comprising:
    sending a second request to the node to modify the file system object of the distributed file system, wherein the second request comprises a third index range that aligns with the second index range of the storage layout of the distributed file system.

11. The method of claim 10, wherein the second request further comprises a hash value identifying a location of the file system object and the hash value is within the second hash range associated with the node containing the file system object.

12. A system comprising:
    a memory storing data of a distributed file system; and
    a processing device of a client device of the distributed file system operatively coupled to the memory, the processing device to:
        transmit, to a node of the distributed file system, a request to modify a file system object of the distributed file system, wherein the request comprises a first index range indicating a beginning and an ending of a first set of file system objects stored by the node, the first index range comprising a first hash range, and wherein the first index range is based on a particular version of a storage layout of the distributed file system stored on the client device;
        receive, from the node, a notification that the particular version of the storage layout of the distributed file system stored on the client device comprises a stale version of the storage layout of the distributed file system, wherein the notification is sent by the node responsive to the first index range not matching a second index range of the storage layout of the distributed file system, the second index range comprising a second hash range;
        send, to the node, a lock request to prevent changes to the storage layout responsive to the notification;

receive at least a portion of the storage layout corresponding to the first index range to update the stale version of the storage layout to the second index range associated with the request; and update the particular version of the storage layout stored on the client device based on the at least the portion of the storage layout corresponding to the first index range.

13. The system of claim 12, wherein the storage layout of the distributed file system is associated with a directory object corresponding to one or more index ranges that span multiple nodes of the distributed file system, wherein each of the one or more index ranges correspond to a storage area on one of the multiple nodes.

14. The system of claim 12, wherein the request further comprises an index value representing the file system object or identifying a location of the file system object, wherein the index value is calculated in view of an object identifier of the file system object and is within the first index range of the request, wherein the index value is not within the second index range.

15. The system of claim 12, wherein the file system object is a directory object and the request to modify the file system object comprises at least one of: an instruction to create a file object within the directory object, an instruction to create a subdirectory object within the directory object, an instruction to remove a subdirectory within the directory object, an instruction to rename the file system object within the directory object, or an instruction to create a link within the directory object.

16. A non-transitory machine-readable storage medium comprising instructions that cause a processing device of a client device of a distributed file system to:

transmit, to a node of the distributed file system, a request to modify a file system object of the distributed file system, wherein the request comprises a first index range indicating a beginning and an ending of a first set of file system objects stored by the node, the first index range comprising a first hash range, and wherein the first index range is based on a particular version of a storage layout of the distributed file system stored on the client device;

receive, from the node, a notification that the particular version of the storage layout of the distributed file system stored on the client device comprises a stale version of the storage layout of the distributed file system, wherein the notification is sent by the node responsive to the first index range not matching a second index range of the storage layout of the distributed file system, the second index range comprising a second hash range;

send, to the node, a lock request to prevent changes to the storage layout responsive to the notification;

receive at least a portion of the storage layout corresponding to the first index range to update the stale version of the storage layout to the second index range associated with the request; and update the particular version of the storage layout stored on the client device based on the at least the portion of the storage layout corresponding to the first index range.

17. The non-transitory machine-readable storage medium of claim 16, wherein the storage layout of the distributed file system is associated with a directory object corresponding to one or more index ranges that span multiple nodes of the distributed file system, wherein each of the one or more index ranges of the storage layout of the distributed file system correspond to a storage area on one of the multiple nodes.

18. The non-transitory machine-readable storage medium of claim 16, wherein the request further comprises an index value representing the file system object or identifying a location of the file system object, wherein the index value is calculated in view of an object identifier of the file system object and is within the first index range of the request, wherein the index value is not within the second index range.

19. The non-transitory machine-readable storage medium of claim 16, wherein the file system object is a directory object and the request to modify the file system object comprises at least one of: an instruction to create a file object within the directory object, an instruction to create a subdirectory object within the directory object, an instruction to remove a subdirectory within the directory object, an instruction to rename the file system object within the directory object, or an instruction to create a link within the directory object.

* * * * *